(12) United States Patent
Puckett

(10) Patent No.: US 10,928,589 B2
(45) Date of Patent: Feb. 23, 2021

(54) METALLIC BLINDER BETWEEN OPTICAL WAVEGUIDES TO REDUCE CROSS TALK

(71) Applicant: Honeywell International Inc., Morris Plains, NJ (US)

(72) Inventor: Matthew Wade Puckett, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 15/900,361

(22) Filed: Feb. 20, 2018

(65) Prior Publication Data

US 2019/0258004 A1 Aug. 22, 2019

(51) Int. Cl.
| | |
|---|---|
| G02B 6/122 | (2006.01) |
| G01C 19/72 | (2006.01) |
| G02B 6/136 | (2006.01) |
| G02B 6/132 | (2006.01) |
| G02B 6/13 | (2006.01) |
| G02B 6/12 | (2006.01) |

(52) U.S. Cl.
CPC ......... *G02B 6/1226* (2013.01); *G01C 19/727* (2013.01); *G02B 6/122* (2013.01); *G02B 6/131* (2013.01); *G02B 6/132* (2013.01); *G02B 6/136* (2013.01); *G02B 2006/121* (2013.01); *G02B 2006/12038* (2013.01); *G02B 2006/12061* (2013.01); *G02B 2006/12104* (2013.01); *G02B 2006/12126* (2013.01)

(58) Field of Classification Search
None
See application file for complete search history.

(56) References Cited

U.S. PATENT DOCUMENTS

| 2003/0185534 A1 | 10/2003 | Kaneko et al. |
| 2005/0201671 A1* | 9/2005 | Kaneko .............. G02B 6/12004 385/15 |

(Continued)

OTHER PUBLICATIONS

European Patent Office, "Extended European Search Report from EP Application No. 19154634.0 dated Jun. 24, 2019", from Foreign Counterpart to U.S. Appl. No. 15/900,361, pp. 1-7, Published: EP.

(Continued)

*Primary Examiner* — Chad H Smith
(74) *Attorney, Agent, or Firm* — Fogg & Powers LLC

(57) ABSTRACT

To reduce or eliminate crosstalk between adjacent integrated optical waveguides, an embodiment of an integrated structure includes, between the optical waveguides, a metal isolation region configured to redirect a signal leaking from one waveguide away from the other waveguide, to absorb the leaking signal, or both to redirect and absorb respective portions of the leaking signal. For example, such an integrated structure includes a cladding, first and second optical cores, and a metal isolation region. The optical cores are disposed in the cladding, and the isolation region is disposed in the cladding between, and separate from, the cores. Including a metal isolation region between adjacent optical waveguides can reduce crosstalk between the waveguides more than coating the waveguides with a metal because the metal coating typically is not thick enough to redirect or absorb enough of a leakage signal to reduce crosstalk to a suitable level.

20 Claims, 7 Drawing Sheets

(56) References Cited

U.S. PATENT DOCUMENTS

| | | | |
|---|---|---|---|
| 2008/0008418 A1 | 1/2008 | Smith et al. | |
| 2010/0008621 A1 | 1/2010 | Shimizu et al. | |
| 2010/0202734 A1* | 8/2010 | DeCorby | G02B 6/12007 385/43 |
| 2012/0139876 A1* | 6/2012 | Jeon | G06F 3/0386 345/175 |
| 2012/0219249 A1 | 8/2012 | Pitwon | |
| 2013/0044973 A1* | 2/2013 | Akiyama | G02F 1/0121 385/2 |
| 2015/0192735 A1* | 7/2015 | Ellis-Monaghan | G02B 6/125 385/14 |
| 2015/0346447 A1* | 12/2015 | Wu | G02B 6/4416 385/101 |
| 2017/0059758 A1 | 3/2017 | Wang et al. | |
| 2017/0274993 A1* | 9/2017 | Beckman | B64C 39/024 |
| 2017/0322373 A1* | 11/2017 | Shi | G02B 6/12004 |
| 2018/0128850 A1* | 5/2018 | Bramhavar | B81B 3/00 |

OTHER PUBLICATIONS

Bloemer et al., "Transmissive properties of Ag/MgF2 photonic band gaps", Applied Physics Letters, Apr. 6, 1998, pp. 1676 through 1678, vol. 72, No. 14, American Institute of Physics.

European Patent Office, "Communication pursuant to Article 94(3) EPC from EP Application No. 19154634.0", from Foreign Counterpart to U.S. Appl. No. 15/900,361, dated Jun. 23, 2020, pp. 1 through 6, Published: EP.

* cited by examiner

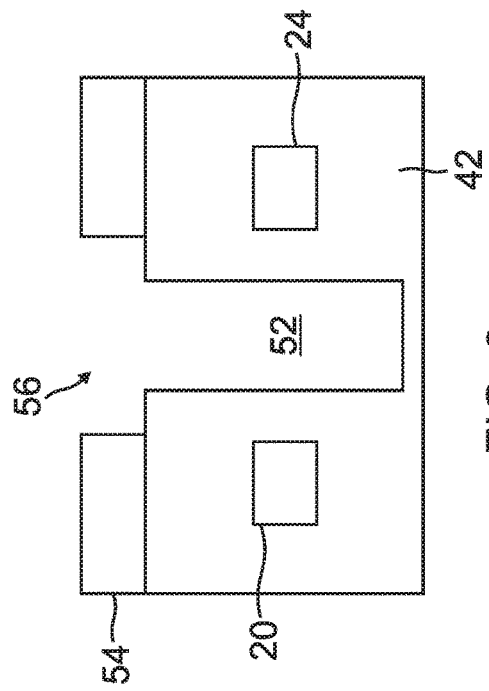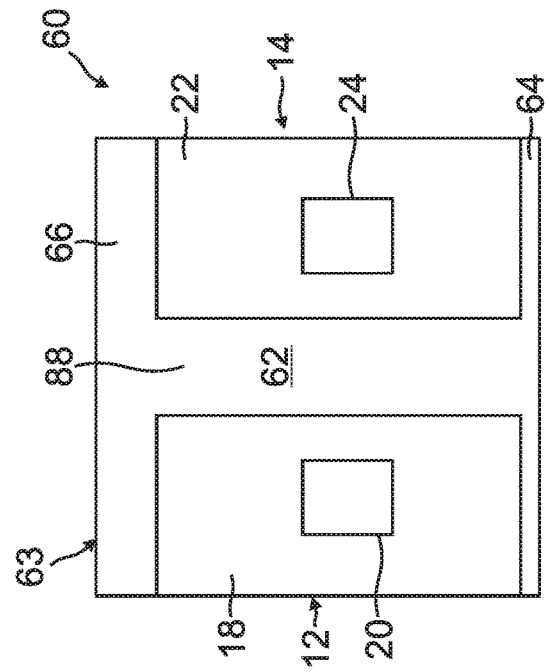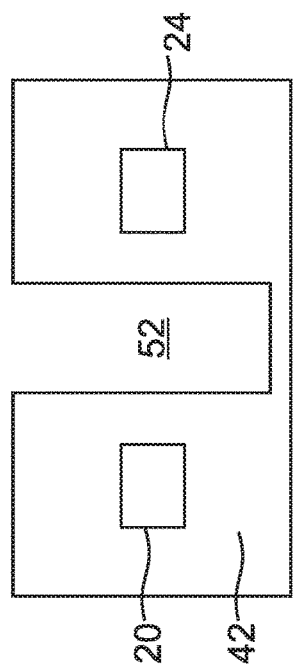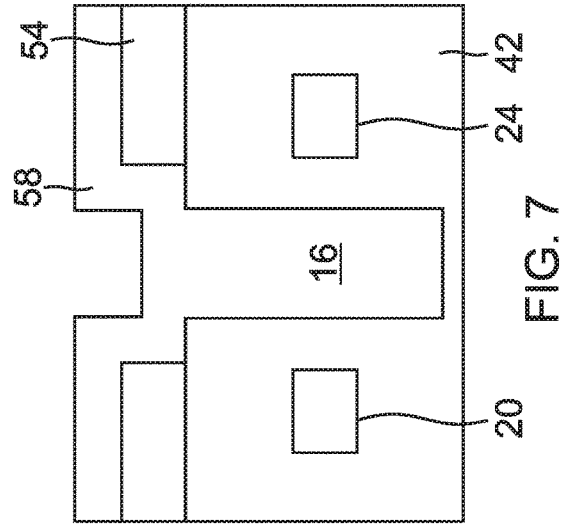

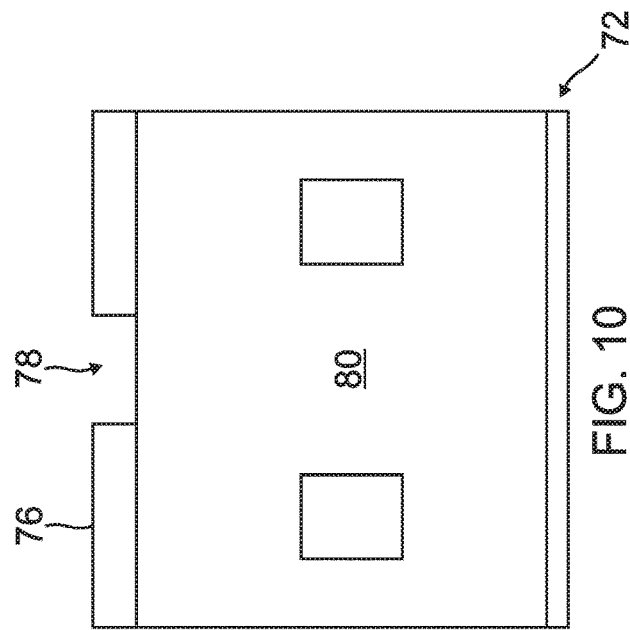
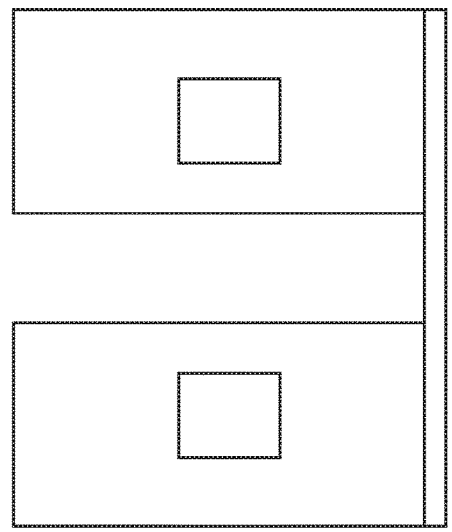
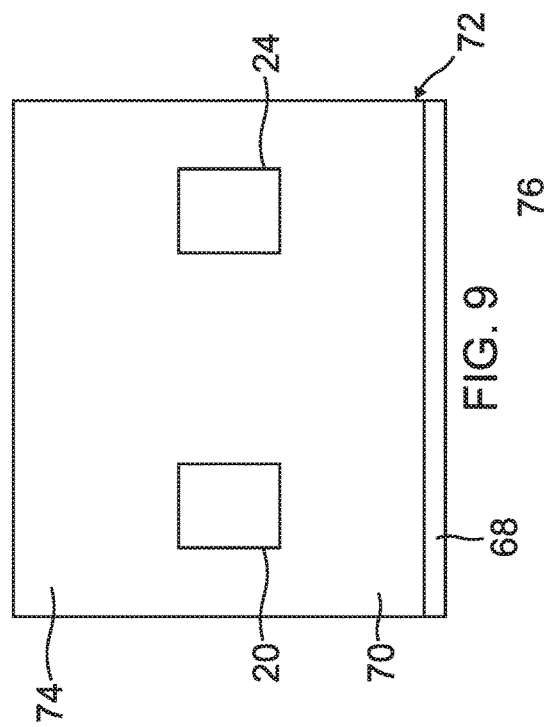
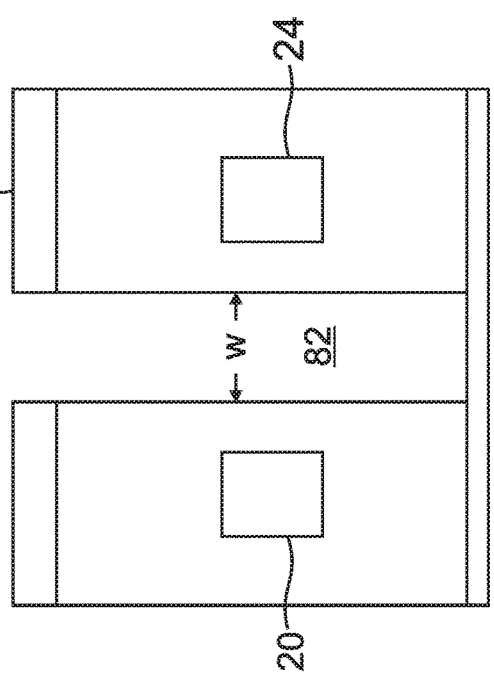

METALLIC BLINDER BETWEEN OPTICAL WAVEGUIDES TO REDUCE CROSS TALK

SUMMARY

Integrated optical structures are being developed for use with, and for incorporation into, semiconductor integrated circuits (ICs), integrated photonics circuits (IPs), and radio-frequency-over-glass (RFOG) circuits, which include electronic components (e.g., transistors) and circuits disposed over, and coupled to, optical components and circuits.

An example of such an optical structure is an integrated optical fiber, i.e., an integrated optical waveguide, which can be configured to carry an optical electromagnetic signal from one location of the IC/IP/RFOG to another location of the IC/IP/RFOG, or which can be configured to form a part of an optical device such as a Pound-Drever-Hall (PDH) loop, a communication assembly, an optical gyroscope (also called a fiber-optic gyroscope (FOG)), and a frequency-comb generator.

Although an optical waveguide, whether integrated or non-integrated, is configured, ideally, not to "leak," out of its side(s), any portion of an optical signal that is propagating therein, an optical waveguide is typically non-ideal, and, therefore, does leak a relatively small portion of the propagating optical signal out of the waveguide side(s).

For non-integrated optical waveguides, such signal leakage typically causes no problems because, even when bundled, non-integrated optical waveguides are relatively thick, and are spaced apart by relatively large distances.

But for integrated optical waveguides, such signal leakage can cause problems because integrated optical waveguides are relatively thin (e.g., on the order of tens to hundreds of microns (μm)), and are spaced apart by relatively small distances (e.g., on the order of ones to hundreds of μm).

For example, leakage of a portion of a first optical signal propagating in a first waveguide into a second waveguide, a phenomenon called "crosstalk," can interfere with a second optical signal propagating in the second waveguide. Such interference can degrade the fidelity of the second optical signal, and, therefore, can limit, or otherwise degrade, the performance of an optical device of which the second waveguide forms a part.

Likewise, leakage of a portion of the second optical signal into the first waveguide can interfere with a first optical signal propagating in the first second waveguide, and can limit, or otherwise degrade, the performance of an optical device of which the first waveguide forms a part.

And if the first and the second waveguides form respective parts of a same optical device, then crosstalk between the first and second waveguides can limit, or otherwise degrade, the performance of the same optical device.

To reduce to a suitable level, or to eliminate, crosstalk between adjacent integrated optical waveguides, an embodiment of an integrated optical structure includes, between the adjacent optical waveguides, a metal isolation region (also called a metal blinder) that is configured to redirect a leakage signal from one waveguide away from the other waveguide, to absorb the leakage signal, or both to redirect and to absorb respective portions of the leakage signal.

For example, an embodiment of an integrated structure includes cladding, first and second optical cores, and an isolation region. The first and second optical cores are disposed in the cladding, and the isolation region includes a metal and is disposed in the cladding between, and separate from, the first and second optical cores.

Including a metal in an isolation region between adjacent integrated optical waveguides can reduce crosstalk between the waveguides more than coating the waveguides with a metal because the metal coating is typically not thick enough to redirect or absorb enough of a leakage signal to reduce crosstalk to a suitable level.

In another embodiment, the metallic isolation region extends underneath the adjacent optical waveguides to reduce further the level of crosstalk between the waveguides.

And in yet another embodiment, the metallic isolation region extends both underneath and over the adjacent optical waveguides to reduce even further the level of crosstalk between the waveguides.

BRIEF DESCRIPTION OF THE DRAWINGS

FIGS. 2-7 are cutaway side views of integrated structures at respective steps in a process for forming the integrated optical structure of FIG. 1, according to an embodiment.

FIG. 8 is a cutaway side view of an integrated optical structure that includes integrated optical waveguides, and a metallic isolation region disposed between, beneath, and above the waveguides and configured to reduce crosstalk between the waveguides, according to an embodiment.

FIGS. 9-12 are cutaway side views of integrated structures at respective steps in a process for forming the integrated optical structure of FIG. 8, according to an embodiment.

DETAILED DESCRIPTION

Each value, quantity, or attribute herein preceded by "substantially," "approximately," "about," a form or derivative thereof, or a similar term, encompasses a range that includes the value, quantity, or attribute±20% of the value, quantity, or attribute, or a range that includes ±20% of a maximum difference from the value, quantity, or attribute, or ±20% of the difference between the range endpoints. For example, an "approximate" range of b−c is a range of b−20%·(c−b) to c+20%·(c−b).

Figure 1:
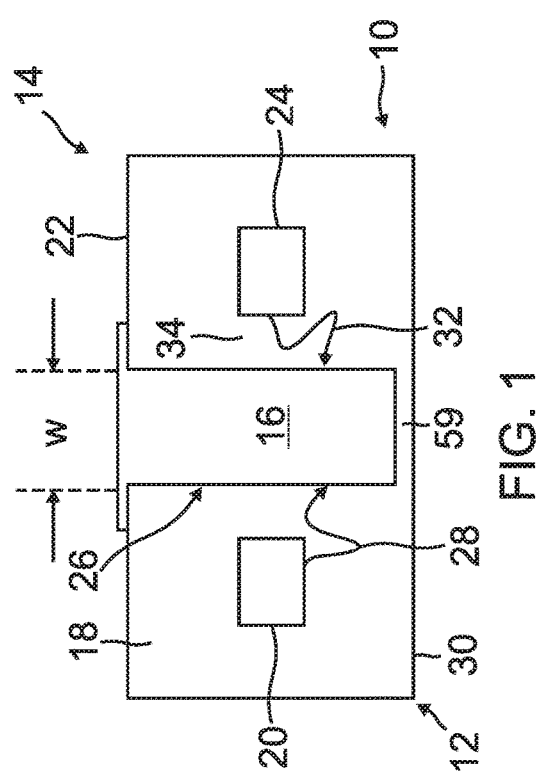
FIG. 1 is a cutaway side view of an integrated optical structure that includes adjacent integrated optical waveguides, and a metallic isolation region disposed, and configured to reduce crosstalk, between the waveguides, according to an embodiment.

FIG. 1 is a cutaway side view of an integrated optical structure 10, according to an embodiment. The structure 10 can be formed over a substrate (not shown in FIG. 1), for example, a silicon-on-insulator (SOI) semiconductor substrate having an upper layer made from single-crystal silicon. Or, the structure 10 can be formed in or over a non-silicon substrate, and a silicon, or SOI, wafer can be disposed and bonded over the structure to provide a semiconductor substrate in which electronic components can be formed over the integrated optical structure 10. And vias and waveguides that extend between the optical and semiconductor portions of such an electro-optic structure can couple electronic circuitry to optical circuitry.

The structure 10 includes adjacent optical waveguides 12 and 14, and a metallic isolation region 16.

The waveguide 12 includes cladding 18 and a core 20. The cladding 18 can be formed from any material suitable to function as the cladding of an optical waveguide; for example, the cladding can be single-crystal silicon that is epitaxially grown from a single-crystal-silicon region of an underlying SOI substrate (not shown in FIG. 1). Furthermore, the core 20 can be formed from any material suitable to function as the core of an optical waveguide; for example, the core can be formed from a material such as silicon dioxide ($SiO_2$), silicon nitride (SiN), or silicon oxynitride (SiON).

Similarly, the waveguide 14 includes cladding 22 and a core 24, which can be similar to the cladding 18 and the core 20, respectively, of the waveguide 12.

The metallic isolation region 16 is disposed in an opening 26, such as a trench, between the cladding 18 and the cladding 22, and is formed from any material suitable for reducing the level of crosstalk between the waveguides 12 and 14 as compared to the level of crosstalk that would exist if the isolation region were omitted from the structure 10. The isolation region 16 includes at least one metal, such as gold, or at least one metal alloy. And a width w of the opening 26 is as least as wide as the deepest skin depth of the metal(s) within the isolation region 16 at the longest wavelength (i.e., the lowest frequency) of the optical signals that the waveguides 12 and 14 are configured, or are otherwise expected, to carry. For example, if the lowest frequency of the optical signals that the waveguides 12 and 14 are configured to carry is 200 terahertz (THz), and the metal in the isolation region 16 with the greatest skin depth at 200 THz is gold, then the width w of the opening 26 can be approximately 1.55 µm, which is more than ten times the skin depth of gold at 200 THz. Furthermore, the isolation region 16 is spaced apart from each of the cores 20 and 24 by a distance in an approximate range of 1 to 10 µm.

Still referring to FIG. 1, while a first optical signal is propagating along the waveguide 12 in a dimension perpendicular to the page of FIG. 1, a first portion 28 of the energy of the first optical signal leaks out any one or more of the sides 30 of the waveguide and propagates toward the waveguide 14; the first leakage portion 28 is also called the first leakage signal.

The metallic isolation region 16 redirects (e.g., reflects) the first leakage signal 28 away from the waveguide 14, absorbs the first leakage signal, or both redirects a portion of the first leakage signal away from the waveguide 14 and absorbs another portion of the first leakage signal. For example, the one or more metals or one or more metal alloys in the isolation region 16 perform the described redirection or the described absorption of the first leakage signal 28.

By redirecting or absorbing the first leakage signal 28 from the waveguide 12, the isolation region 16 reduces the portion of the first leakage signal that propagates into the waveguide 14 as compared to the portion of the first leakage signal that would propagate into the waveguide 14 in the absence of the isolation region.

Similarly, while a second optical signal is propagating along the waveguide 14, a second portion 32 of the energy of the second optical signal leaks out any one or more of the sides 34 of the waveguide and propagates toward the waveguide 12; the second leakage portion 32 is also called the second leakage signal.

The isolation region 16 redirects (e.g., reflects) the second leakage signal 32 away from the waveguide 12, absorbs the second leakage signal, or both redirects a portion of the second leakage signal away from the waveguide 12 and absorbs another portion of the second leakage signal. For example, the one or more metals or one or more metal alloys in the isolation region 16 perform the described redirection or the described absorption of the second leakage signal 32.

By redirecting or absorbing the second leakage signal 32, the isolation region 16 reduces the portion of the second leakage signal that propagates into the waveguide 12 as compared to the portion of the second leakage signal that would propagate into the waveguide 12 in the absence of the isolation region.

Consequently, by functioning in the above-described manner, the isolation region 16 reduces a level of crosstalk between the waveguides 12 and 14 as compared to the level of crosstalk that would exist between the waveguides in the absence of the isolation region.

Still referring to FIG. 1, alternate embodiments of the integrated optical structure 10 are contemplated. For example, the integrated structure 10 can include more than two waveguides 12 and 14, and can include more than one isolation region 16, each disposed between respective pairs of adjacent waveguides. Furthermore, although shown has having rectangular cross sections, the isolation region 16, the cladding 18 and 22, and the cores 20 and 24 can have any suitably shaped cross sections such as circular cross sections, square cross sections, or oval cross sections. In addition, alternate embodiments described in conjunction with FIGS. 2-18 may be applicable to the integrated optical structure 10.

FIGS. 2-7 are cutaway side views of intermediate versions of the integrated optical structure 10 of FIG. 1 that exist at respective times during a process for forming the integrated optical structure, according to an embodiment.

Referring to FIGS. 1-7, a process for forming the integrated optical structure 10 of FIG. 1 is described, according to an embodiment.

Figure 2:
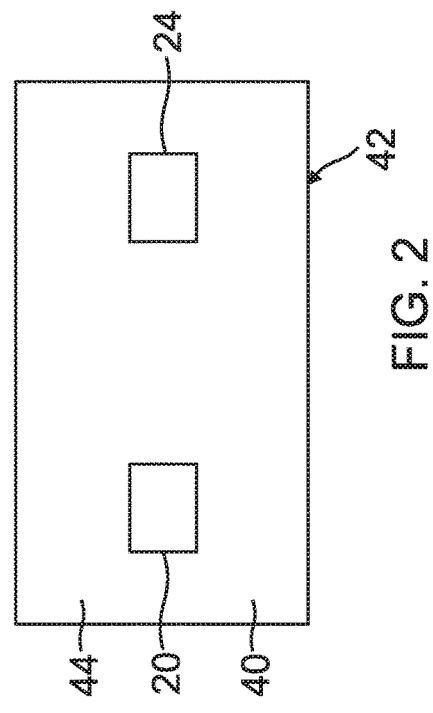

Referring to FIG. 2, a bottom portion 40 of a cladding layer 42 is formed. For example, the bottom portion 40 can be formed by chemical-vapor deposition (CVD), plasma-enhanced CVD (PECVD), or sputtering of any suitable cladding material, such as silicon dioxide, on a suitable semiconductor (e.g., single-crystalline silicon) or non-semiconductor (e.g., sapphire, ceramic) substrate. Alternatively, the bottom portion 40 of the cladding layer 42 can be epitaxially grown on a single-crystal substrate such as a single-crystal silicon substrate or a sapphire substrate.

Next, the cores 20 and 24 are formed over the bottom portion 40 of the cladding layer 42. For example, the cores 20 and 24 can be formed by CVD, PECVD, or sputtering of any suitable material such as $SiO_2$, SiN, or SiON. The cores 20 and 24 can be formed as a single layer that is anisotropically etched to form the cores, or the cores can be formed in trenches of a sacrificial layer formed over the bottom portion 40 of the cladding layer 42.

Then, a top portion 44 of the cladding layer 42 is formed over the bottom portion 40, and over and between the cores 20 and 24. For example, the top portion 44 of the cladding layer 42 can be formed in the same manner, and from the same material, as the bottom portion 40. Alternatively, even if the bottom portion 40 is not formed by epitaxy, the top portion 44 can be epitaxially grown over the bottom portion.

Figure 3:
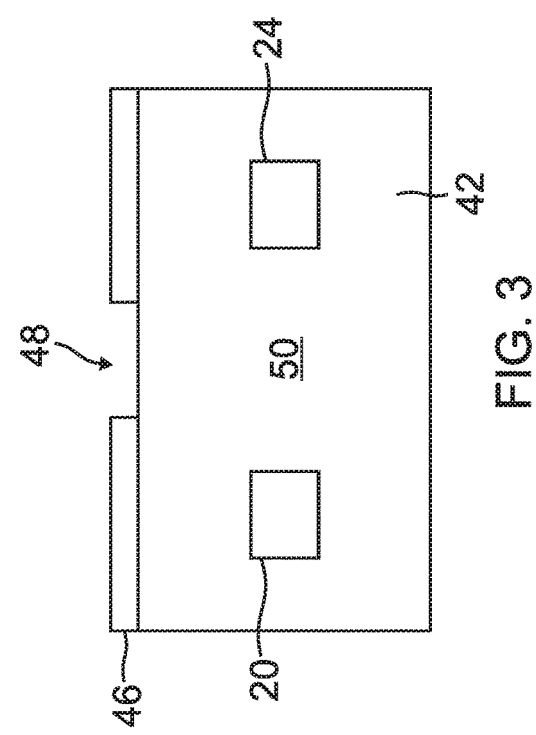

Referring to FIG. 3, a photo resist layer 46 is formed over the cladding layer 42, and is patterned to have an opening 48 that is aligned with a region 50 of the cladding layer between the cores 20 and 24.

Figure 4:
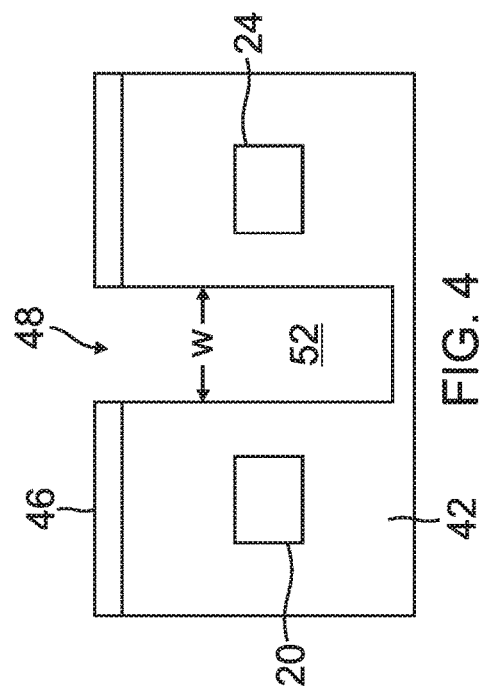

Referring to FIG. 4, an opening 52 is formed in the cladding layer 42 in alignment with the opening 48 in the photoresist layer 46. For example, the opening 52 is a trench that is formed by anisotropically etching (e.g., by reactive-ion etching) the portion of the cladding layer 42 exposed through the photoresist opening 48, and that has the width w as described above in conjunction with FIG. 1. Ideally, a center of the opening 52 is equidistant from the cores 20 and 24, although in practice the trench center may not be equidistant from the cores.

Referring to FIG. 5, the photoresist layer 46 is removed.

Referring to FIG. 6, a photoresist layer 54 is formed over the cladding layer 42, and is patterned to have an opening 56 that is aligned with, and that is wider than, the opening 52 in the cladding layer 42.

Referring to FIG. 7, the opening 52 is filled with an optical-electromagnetic-signal isolation material 58 to form the isolation region 16. For example, the isolation material 58 includes one or more metals or metal alloys such as gold, titanium, aluminum, tin, nickel, copper, platinum, or silver. And the opening 52 is filled with the isolation material 58, for example, by CVD, PECVD, or sputtering.

Referring again to FIG. 1, the photoresist layer 54 and the isolation material 58 are removed, e.g., by etching or chemical-mechanical polishing (CMP) to yield the integrated optical structure 10. Alternatively, at least a portion of the isolation material 58 over the cladding layer 42 can remain to provide an electrical contact for biasing the isolation region 16 to a desired voltage such as ground.

Referring to FIGS. 1-7, alternate embodiments of the process for forming the integrated optical structure 10 are contemplated. For example, the above-described steps may be performed in an order different from that described. Furthermore one or more of the described steps may be omitted, and one or more steps not described may be included. Moreover, one or more embodiments described in conjunction with FIGS. 1 and 8-18 may be applicable to the process described in conjunction with FIGS. 1-7.

Referring again to FIG. 1, a potential problem with the integrated optical structure 10 is that sometimes portions of one or both of the leakage signals 28 and 32 can propagate through a portion 59 of the cladding layer 42 beneath the isolation region 16, and, therefore, can cause crosstalk between the waveguides 12 and 14 despite the presence of the isolation region. In more detail, the leakage signal 28 sometimes can excite, in the cladding 18, one or more plasmonic modes that cause at least a portion of the leakage signal to propagate through the cladding 18, the portion 59 of the cladding layer beneath the isolation region 16, and the cladding 22, and into the core 24. Similarly, the leakage signal 32 sometimes can excite, in the cladding 22, one or more plasmonic modes that cause at least a portion of the leakage signal to propagate through the cladding 22, the portion 59 of the cladding layer beneath the isolation region 16, and the cladding 18, and into the core 20. Consequently, the portion 59 of the cladding layer 42 beneath the isolation region 16 may allow plasmonic modes excited in the cladding 18 and 22 to cause crosstalk between the waveguides 12 and 14.

FIG. 8 is a cutaway side view of an integrated optical structure 60, which is configured to reduce the level crosstalk as compared to the level of crosstalk allowed by the integrated optical structure 10 of FIG. 1, according to an embodiment.

The integrated optical structure 60 is similar to the integrated optical structure 10 of FIG. 1, except that a first portion 62 of a metallic isolation region 63 of the structure 60 extends all the way through the cladding 18 and 22 such that there is no portion of the cladding layer beneath the isolation region through which plasmonic-induced leakage signals can propagate. And the isolation region 63 can have a second portion 64 beneath the waveguides 12 and 14, and can have a third portion region 66 over the waveguides. Like the first portion 62, the second and third portions 64 and 66 of the isolation region 63 function to reduce or eliminate crosstalk by redirecting at least a portion of a signal leaking from one of the waveguides 12 and 14 away from the other of the waveguides, by absorbing a portion of a leakage signal, or by both redirecting and absorbing respective portions of a leakage signal, as described above in conjunction with FIG. 1.

FIGS. 9-12 are cutaway side views of intermediate versions of the integrated optical structure 60 of FIG. 8 that exist at respective times during a process for forming the integrated optical structure, according to an embodiment.

Referring to FIGS. 8-12, a process for forming the integrated optical structure 60 is described, according to an embodiment in which structures common to FIGS. 1-7 are labeled with same reference numbers.

Referring to FIG. 9, a metal layer 68 is formed, and then a bottom portion 70 of a cladding layer 72 is formed over the metal layer. For example, the metal layer 68 can be formed over a substrate (not shown in FIG. 9) by CVD or PECVD of any suitable material that includes a metal or a metal alloy. And the bottom portion 70 of the cladding layer 72 can be formed over the metal layer 68 by CVD, PECVD, or sputtering of any suitable cladding material, such as the same material from which the cladding layer 42 of FIG. 2 is formed. The metal layer forms the portion 64 of the isolation region 63 of FIG. 8.

Next, the cores 20 and 24 are formed over the bottom portion 70 of the cladding layer 72. For example, the cores 20 and 24 can be formed by CVD, PECVD, or sputtering of a material such as $SiO_2$, SiN, or SiON. The cores 20 and 24 can be formed as a single layer that is anisotropically etched to form the cores, or the cores can be formed in trenches of a sacrificial layer that is formed over the bottom portion 70 of the cladding layer 72.

Then, a top portion 74 of the cladding layer 72 is formed over the bottom portion 70, and over and between the cores 20 and 24. For example, the top portion 74 of the cladding layer 72 can be formed in the same manner as, and from the same material, as the bottom portion 70. Alternatively, the top portion 74 can be epitaxially grown over the bottom portion 70.

Referring to FIG. 10, a photo resist layer 76 is formed over the cladding layer 72, and is patterned to have an opening 78 that is aligned with a region 80 of the cladding layer between the cores 20 and 24.

Referring to FIG. 11, an opening 82 is formed in the cladding layer 72 in alignment with the opening 78 in the photoresist layer 76. For example, the opening 82 is a trench that is formed by anisotropically etching (e.g., by reactive-ion etching) the portion of the cladding layer 72 exposed through the photoresist opening 78, and that has the width w as described above in conjunction with FIG. 1. Ideally, a center of the trench 82 is equidistant from the cores 20 and 24, although, in practice, the trench center may not be equidistant from the cores.

Referring to FIG. 12, the photoresist layer 76 is removed.

Referring to FIG. 8, the opening 82 is filled with an optical-electromagnetic-signal isolation material 88 to form the portions 62 and 66 of the isolation region 63. For example, the isolation material 88 includes one or more metals or metal alloys such as gold, titanium, aluminum, tin, nickel, copper, platinum, or silver. In an embodiment, the isolation material 88 is the same as the material from which the metal layer 68 (FIG. 9) is formed. And the opening 82 (FIG. 11) is filled with, and the waveguides 12 and 14 are covered by, the isolation material 88, by, for example, by CVD, PECVD, or sputtering. Furthermore, the isolation region 63 can be biased to an electrical voltage such as ground.

Still referring to FIG. 8, alternatively, the isolation material 88 over the waveguides 12 and 14 can be removed, e.g., by etching or (CMP) to yield a version of the integrated optical structure 60 lacking the third portion 66 of the isolation region 63.

Referring to FIGS. 8-12, alternate embodiments of the process for forming the integrated optical structure 60 are contemplated. For example, the above-described steps may be performed in an order different from that described. Furthermore one or more of the described steps may be omitted, and one or more steps not described may be included. In addition, one or more embodiments described in conjunction with FIGS. 1-7 and 13-18 may be applicable to the process described in conjunction with FIGS. 8-12.

Figure 13:
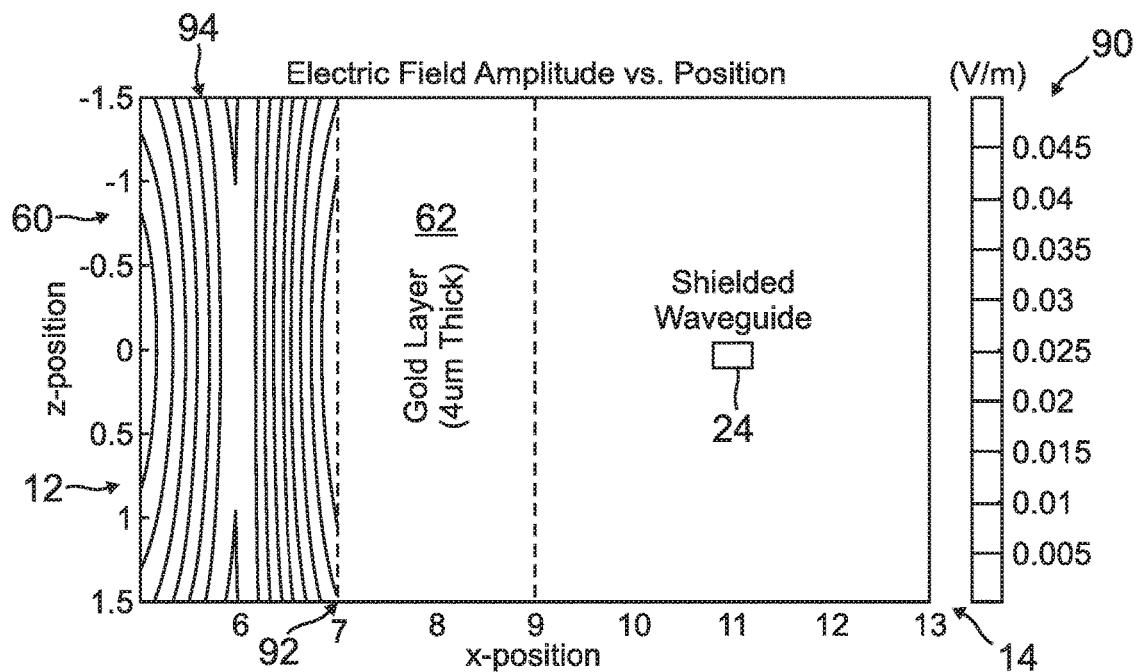
FIG. 13 is a linear plot of the amplitude versus distance of an electric field between the optical waveguides of FIG. 8, laid over a portion of the integrated optical structure of FIG. 8, according to an embodiment.

FIG. 13 is a linear plot 90 of the amplitude versus distance of an electric field between the optical waveguides 12 and 14 of FIG. 8, the plot overlaying a diagram of a portion the integrated optical structure 60 of FIG. 8, according to an embodiment in which the isolation region 63 is formed from gold and only the waveguide 12 carries an optical signal. The electric-field amplitude reaches its approximately minimum value at the boundary 92 between the waveguide 12 and the isolation region 63, thus indicating that the isolation region is redirecting or absorbing most, if not all, of any optical signal leaking from the sides of the waveguide 12. The electric-field amplitude maintains approximately its minimum value throughout the isolation region 63 and throughout the waveguide 14. The electric-field amplitude has a second minimum at a location 94 within the waveguide 12 due to destructive interference between the leakage signal and redirections of the leakage signal from the surface of gold isolation region 63 at the boundary 92.

Figure 14:
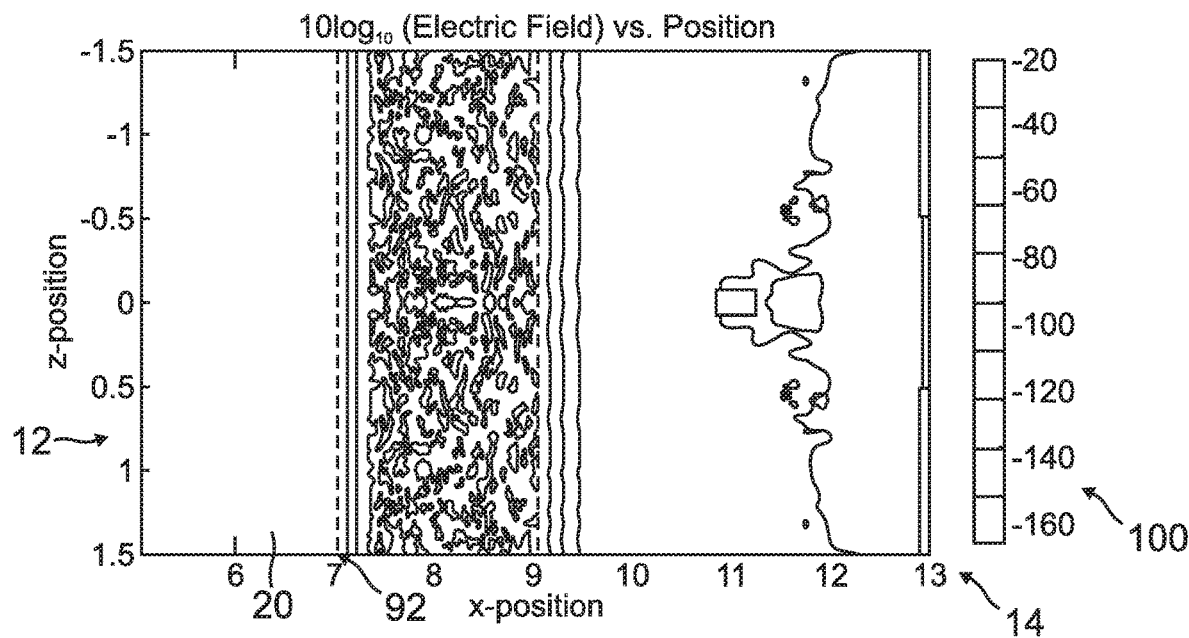
FIG. 14 is a logarithmic plot of the amplitude versus distance of an electric field between the optical waveguides of FIG. 8, laid over a portion of the integrated optical structure of FIG. 8, according to an embodiment.

FIG. 14 is a logarithmic plot 100 of the amplitude versus distance of an electric field between the optical waveguides 12 and 14 of FIG. 8, the plot overlaying a diagram of a portion of the integrated optical structure 60 of FIG. 8, according to an embodiment in which the isolation region 63 is formed form gold and only the waveguide 12 carries an optical signal; that is, the plot 100 is a logarithmic version of the plot 90 of FIG. 13. The electric-field amplitude in the waveguide 14 is approximately 140 dB down from the electric-field amplitude in the cladding 20 of the waveguide 12. Therefore, it follows that the leakage-signal power in the waveguide 14 is approximately 280 dB down from the leakage-signal power at the boundary 92 between the waveguide 12 and the gold isolation region 63.

Figure 15:
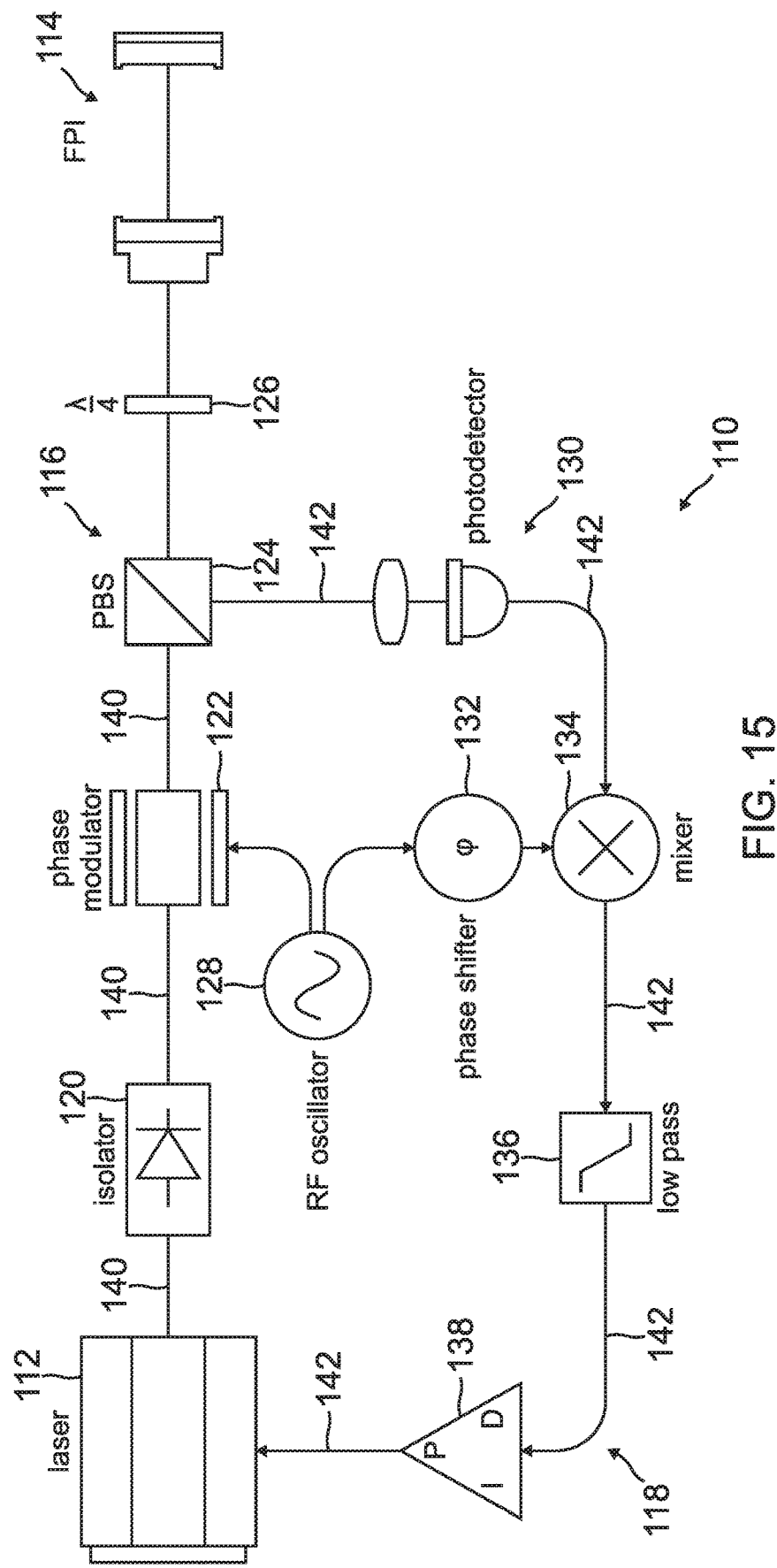
FIG. 15 is a diagram of a Pound-Drever-Hall (PDH) loop including optical waveguides that are separated by the metallic isolation region of FIG. 1, or by the metallic isolation region of FIG. 8, according to an embodiment.

FIG. 15 is a diagram of a PDH servo loop 110 and a semiconductor laser 112, according to an embodiment in which the PDH loop incorporates, between adjacent optical waveguides, metallic isolation regions, such as the isolation regions 16 and 63 of FIGS. 1 and 8.

The PDH loop 110 is configured to use negative feedback to lock the frequency of a laser beam generated by the laser 112 to a resonant frequency of a Fabry-Perot cavity 114.

The PDH loop 110 includes a forward path 116 and a feedback path 118 that partially overlaps the forward path.

In addition to the cavity 114, the forward path 116 includes a signal isolator 120, a phase modulator 122, a polarizing beam splitter (PBS) 124, a quarter-wavelength plate 126, and an oscillator 128.

And the feedback path includes the cavity 114, the plate 126, the PBS 124, a photodetector 130, the oscillator 128, a phase shifter 132, a mixer 134, a low-pass filter (LPF) 136, and a proportional-integral-derivative (PID) controller 138.

In operation, the laser 112 generates a main beam that exits the left side of the laser, and generates a calibration beam that exits the right side of the laser; the main and control beams have the same frequency, and the power of the calibration beam is much less (e.g., at least approximately ten times to one hundred times less) than the power of the main beam.

The calibration beam propagates through the isolator 120, which prevents any optical signals from propagating from right to left back through the isolator to the laser 12.

The oscillator 128 generates an electrical sinusoidal signal, the phase modulator 122 modulates the calibration beam with the sinusoidal signal, and the modulated calibration beam passes through the PBS 124 and plate 126 to the cavity 114.

The cavity 114 effectively mixes the modulated calibration beam with a reference beam generated by the cavity and having the cavity's resonant frequency, and this feedback beam propagates through the plate 126, and the PBS 124 directs the feedback beam to the photo detector 128, which converts the feedback beam into an electrical feedback signal.

The phase shifter 132 shifts the phase of the sinusoidal oscillator signal, and the mixer 134 demodulates the electrical feedback signal with the phase-shifted sinusoidal oscillator signal.

The LPF 136 filters out the higher-frequency content of the demodulated feedback signal, and generates, and passes to the PID controller 138, an error signal.

The PID controller 138 generates, in response to the error signal, a control signal that shifts the frequency of the main and calibration laser beams by an amount and in a direction effectively indicated by the error signal. For example, if the frequency of the calibration laser beam equals the resonant frequency of the cavity, which is desired, then the error signal equals approximately zero, and the PID controller generates the control signal to maintain the frequency of the main and control laser beams at their current frequency. If the error signal is positive, then the frequency of the main and calibration laser beams is too high, and the PID controller 138 generates the control signal to reduce the frequency of the main and control laser beams toward the resonant frequency of the cavity 114. Conversely, if the error signal is negative, then the frequency of the main and calibration laser beams is too low, and the PID controller 138 generates the control signal to increase the frequency of the main and calibration laser beams toward the resonant frequency of the cavity 114.

Crosstalk between the waveguides 140 that couple the components in the forward path 116 and the waveguides 142 that couple the components in the feedback path 118 can degrade the performance of the PDH loop 110. For example, such crosstalk can cause there to be a significant difference between the frequency of the main and calibration laser beams generated by the laser 112 and the resonant frequency of the cavity 114 (the reference frequency).

Consequently, including at least one metal isolation region, such as the isolation region 16 of FIG. 1 or the isolation region 63 of FIG. 8, between the waveguides 140 in the forward path 116 and the waveguides 142 in the feedback path 118 significantly reduces crosstalk, and, therefore, significantly increases the accuracy and fidelity of the PDH loop 110, as compared to a PDH loop with no metallic isolation regions between the waveguides.

Still referring to FIG. 15, alternate embodiments of the PDH loop 110 are contemplated. For example, the PDH loop 110 can include components not described above, or can omit one or more of the described components. Furthermore, respective metal isolation regions can be included between any pairs of waveguides or waveguide sections. Moreover, one or more embodiments described in conjunction with FIGS. 1-14 and 16-18 may be applicable to the PDH loop 110.

Figure 16:
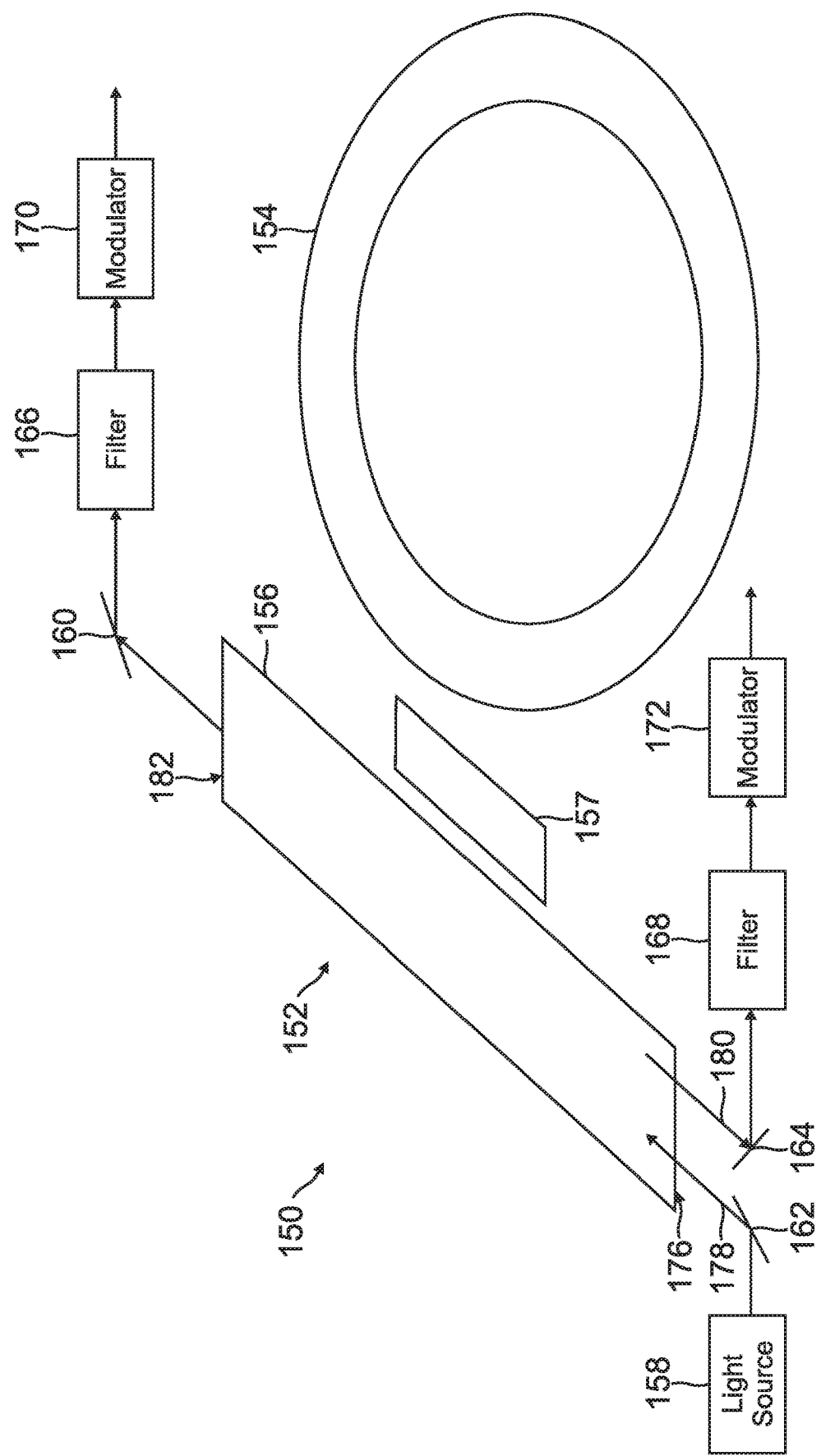
FIG. 16 is a diagram of an optical communication assembly including optical waveguides that are separated by the metallic isolation region of FIG. 1, or by the metallic isolation region of FIG. 8, according to an embodiment.

FIG. 16 is a diagram of an optical communication assembly 150, which includes an optical resonator 152 having a resonator section 154 and a bus waveguide 156, which are separated by one or more metallic isolation regions 157, each of which can be similar to, or the same as, as the region 16 of FIG. 1 or the region 63 of FIG. 8, according to an embodiment.

In addition to the optical resonator 152, the optical communication assembly 150 includes a light source 158 (e.g., a laser), deflectors 160, 162, and 164, first and second filters 166 and 168, and first and second modulators 170 and 172.

Operation of the optical communication assembly 150 is described according to an embodiment in which the assembly exploits Brillouin scattering to generate one or more Stokes waves for use as information-carrier waves.

For purposes of example, assume that the FWHM Brillouin bandwidths of the ring resonator 154 and the bus waveguide 156 are aligned with, i.e. overlap or include, at least two resonant frequencies, $f_n$ and $f_{n-x}$, where, for example, $f_n=1.55\times10^{10}$ and $f_{n-x}=1.545\times10^{10}$.

In response to the light source 158 pumping an input end 176 of the bus waveguide 156 with a pumped light wave 178 having the frequency $f_n$, Brillouin scattering, stimulated/induced by the pumped light wave, generates a counter-propagating Stokes wave 180 having the frequency $f_{n-x}$.

The ring resonator 154 reinforces the pumped light wave 178 at the frequency $f_n$, and, therefore, the pumped light wave propagates from the input end 176 to, and out from, an output end 182 of the bus waveguide 156.

The ring resonator 154 also reinforces the Stokes light wave 180 at the frequency $f_{n-x}$, and, therefore, the Stokes light wave counter-propagates out from the input end 176 the bus waveguide 156.

Consequently, the optical resonator 152 reinforces two resonant modes at $f_n$ and $f_{n-x}$ such that the portion of the pumped light wave's energy that stimulates the Brillouin scattering excites a resonant mode at $f_{n-x}$ instead of being dissipated/wasted, e.g., as heat. That is, by virtue of the FWHM Brillouin bandwidth of the optical resonator 152 overlapping at least one resonant frequency of the optical resonator, the optical communication assembly 150 is configured to exploit Brillouin scattering, which is often an unwanted phenomenon, to generate at least two carrier waves, one at $f_n$ and the other at $f_{n-x}$, in response to only a single pumped light wave 178.

The filter 166, which may be optional, filters the pumped light wave 178 propagating from the output end 182 of the bus waveguide 156, the modulator 170 modulates the filtered pumped light wave with first data, and an optical fiber (not shown in FIG. 16) coupled to the output of the modulator transmits the modulated pumped light wave to a remote receiver for demodulation and recovery of the first data.

Similarly, the filter 168, which may be optional, filters the Stokes light wave 180, the modulator 172 modulates the filtered Stokes light wave with second data, and an optical fiber (not shown in FIG. 16, and can be the same optical fiber that carries the modulated pumped light wave) coupled to the output of the modulator 172 transmits the modulated Stokes wave to the remote receiver for demodulation and recovery of the second data.

Including one or more metal isolation regions 157 between the ring resonator 154 and the bus waveguide 156 reduces crosstalk between the resonator and the bus waveguide, and, therefore, increases the accuracy and fidelity of the communication assembly 150 as compared to a version of the communication assembly that lacks one or more metallic isolation regions.

Still referring to FIG. 16, alternate embodiments of the optical communication assembly 150 are contemplated. For example, if the FWHM Brillouin bandwidths of the ring resonator 154 and the bus waveguide 156 are wide enough, the Stokes wave 180 can beget one or more additional Stokes waves at respective optical resonant frequencies of the ring resonator and the bus waveguide, and these one or more additional Stokes waves can be used as one or more additional carrier waves. The filters 166 and 168 can isolate the different carrier waves so that the modulators 170 and 172 can modulate each carrier wave with different data (with only one pumped light wave 178 and only one Stokes wave 180 as described above, the filters 166 and 168 may be omitted from the optical communication assembly 150). Furthermore, the optical communication assembly 150 can include one or more additional components (e.g., multiplexers, demultiplexers, optical couplers) that are omitted from FIG. 16, and can omit one or more components that are described above in conjunction with FIG. 15. Moreover, one or more embodiments described in conjunction with FIGS. 1-15 and 17-18 may be applicable to the optical assembly 150.

Figure 17:
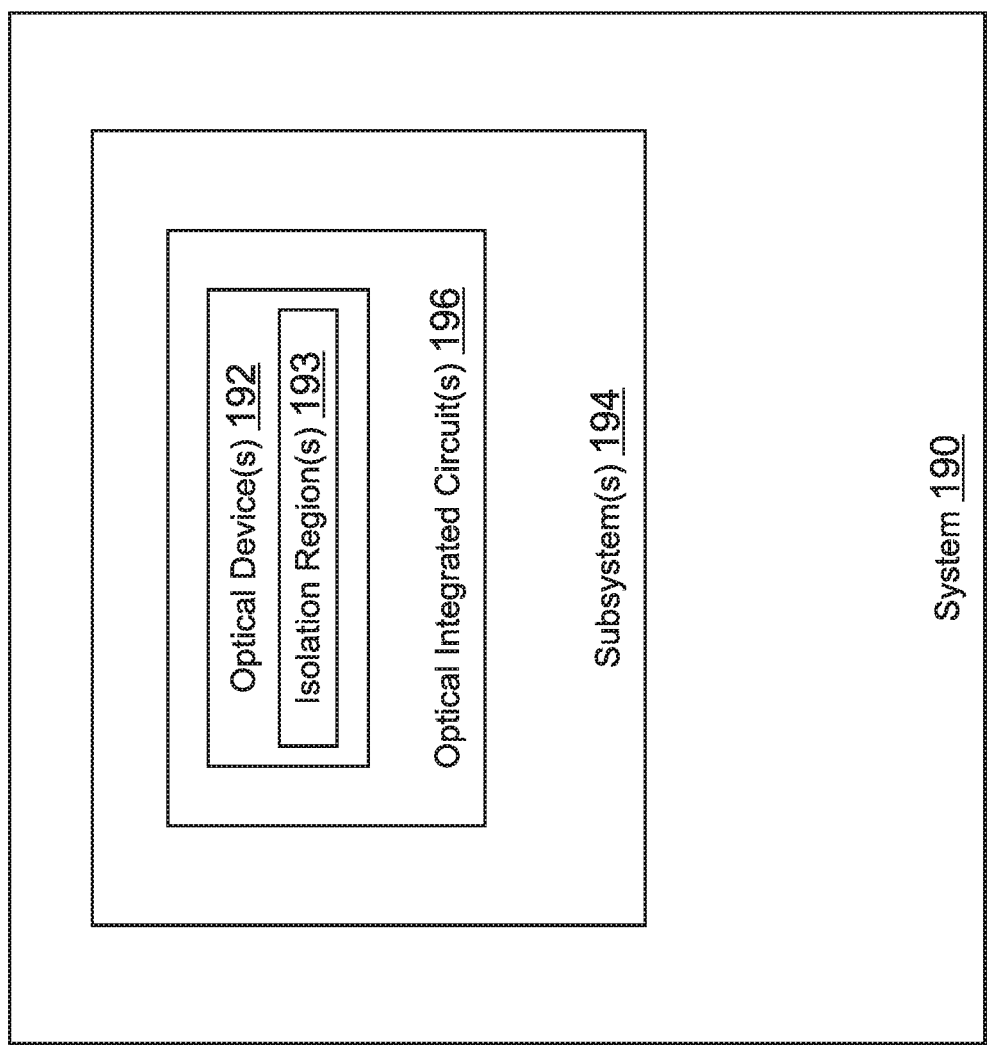
FIG. 17 is a diagram of a system (e.g., a vehicle) and a subsystem (e.g., a navigation subsystem) that incorporates one or more optical devices such as the optical devices of FIGS. 15-16, according to an embodiment.

FIG. 17 is a diagram of a system 190, which incorporates one or more optical devices 192, such as the PDH loop 110 of FIG. 15 and the optical communication assembly 150 of FIG. 16, according to an embodiment in which at least one optical device includes at least one pair of adjacent optical waveguides in which at least one metallic isolation region 193 is disposed between at least one pair of adjacent waveguides to reduce crosstalk between the waveguides. For example, each of the at least one metallic isolation region 193 can be similar to, or the same as, the metallic isolation region 16 of FIG. 1 or the metallic isolation region 63 of FIG. 8.

The system 190, which can be, for example, a manned or unmanned vehicle such as an aircraft, spacecraft, watercraft, drone, or land vehicle, includes one or more subsystems 194 (only one subsystem shown in FIG. 17).

The one or more subsystems 194, which can be, for example, a navigation subsystem, communication subsystem, steering subsystem, or propulsion subsystem, include one or more optical integrated circuits 196 (only one integrated circuit shown in FIG. 17). Examples of an optical integrated circuit 196 include an IC, IP, and RFOG.

At least one of the one or more integrated circuits 196 includes optical components (e.g., waveguides, lasers) or both optical and electronic components (e.g., transistors), and includes one or more optical devices 192.

The one or more optical devices 192, which can be for example, the PDH loop 110 of FIG. 15, the optical communication assembly 150 of FIG. 16, or an optical gyroscope, include one or more pairs of adjacent waveguides (not shown in FIG. 17) or waveguide sections, and at least one metal isolation region 193 disposed between at least one pair of adjacent waveguides or waveguide sections, or otherwise positioned, to reduce crosstalk between the adjacent waveguides or waveguide sections as compared to a similar optical structure lacking the at least one metal isolation region.

Still referring to FIG. 17, alternate embodiments of the system 190 are contemplated. For example, one or more embodiments described in conjunction with FIGS. 1-16 may be applicable to the system 190.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple integrated-circuit (IC), integrated-photonic (IP) dies, or radio-frequency-over-glass (RFOG) dies to form one or more ICs/IPs/RFOGs, where these one or more ICs/IPs/RFOGs may be coupled to one or more other ICs/IPs/RFOGs. Furthermore, one or more components of a described apparatus or system may have been omitted from the description for clarity or another reason. Moreover, one or more components of a described apparatus or system that have been included in the description may be omitted from the apparatus or system.

What is claimed is:

1. An integrated structure, comprising:
   a cladding having an outer perimeter;
   first and second optical cores disposed in the cladding and configured for a wavelength of energy;
   an isolation region including a metal having a skin depth at the wavelength, the isolation region disposed in the cladding between, and separate from, the first and second optical cores and being as wide as, or wider than, the skin depth in a dimension that extends from the first core toward the second core; and
   the metal being wrapped around the outer perimeter of the cladding along at least a respective top, a respective bottom, and a respective side of each of the first and second optical cores.

2. The integrated structure of claim 1 wherein the cladding includes silicon.

3. The integrated structure of claim 1 wherein at least one of the first and second optical cores includes at least one of silicon, oxygen, and nitrogen.

4. The integrated structure of claim 1 wherein the isolation region includes a metal alloy.

5. The integrated structure of claim 1 wherein the isolation region is configured to redirect, away from one of the first and second cores, energy that leaks from the other of the first and second cores.

6. The integrated structure of claim 1 wherein the isolation region is configured to absorb energy that leaks from one of the first and second cores.

7. The integrated structure of claim 1 wherein the metal includes a metal alloy.

8. A method, comprising:
   forming optical cores in a cladding having an outer perimeter;
   forming, in the cladding, an opening between, and separated from, two of the cores; and
   forming an isolation region by disposing a metal in the opening at least until a metal extends around the outer perimeter along at least a respective bottom, a respective top, and a respective side of each of the two optical cores.

9. The method of claim 8, further comprising forming the cladding.

10. The method of claim 8 wherein:
    forming the optical cores includes configuring the optical cores to carry a frequency of electromagnetic energy; and
    forming the opening includes etching a trench that is approximately as wide as, or that is wider than, a skin depth of the metal for electromagnetic energy at the frequency.

11. A method, comprising:
    forming optical cores in a cladding that is disposed over a layer of a first metal;
    forming, in the cladding, an opening that is between, and separated from, two of the cores, and that exposes the layer of the first metal; and
    filling the opening with a second metal such that the second metal spans the opening from the layer of the first metal to a top of the cladding so that a metal wraps around at least a respective top, a respective bottom, and a respective side of each of the optical cores.

12. The method of claim 11 wherein the first and second metals include a same metal.

13. The method of claim 11, further comprising:
    forming the layer of the first metal; and
    forming the cladding over the layer of the first metal.

14. A device, comprising:
    an integrated optical structure, including
       first and second optical cores respectively disposed in separate cladding regions, and
       an isolation region disposed between the cladding regions, separate from the first and second optical cores, and including a metal wrapped around at least a respective top, a respective bottom, and a respective side of each of the first and second optical cores.

15. The device of claim 14 wherein the integrated optical structure includes:
    a reference cavity;
    a laser;
    the first optical core coupled between the laser and the reference cavity; and
    a feedback loop disposed between the reference cavity and the laser and including the second optical core.

16. A subsystem, comprising:
    an optical device, including
       an integrated optical structure, including
          first and second optical cores respectively disposed in separate cladding regions, and
          an isolation region disposed between the cladding regions, separate from the first and second optical cores, and including a metal wrapped around a respective top, a respective bottom, and a respective side of each of the first and second optical cores.

17. The subsystem of claim 16 wherein the optical device includes an optical gyroscope.

18. A subsystem, comprising:
an optical device, including
an integrated Pound-Drever-Hall loop including
first and second optical cores configured for a wavelength of energy and disposed in a cladding layer having an outer perimeter, and
an isolation region disposed in the cladding layer between, and separate from, the first and second optical cores, including a metal wrapped around the outer perimeter of the cladding along at least a respective top, a respective bottom, and a respective side of each of the first and second optical cores, and being at least as wide as a skin depth of the metal at the wavelength in a dimension along which the first and second optical cores lie.

19. A vehicle, comprising:
subsystem, including
an optical device, including
an integrated optical structure, including
first and second optical cores configured for a wavelength of energy and disposed in a cladding having an outer perimeter, and
an isolation region disposed in the cladding between, and separate from, the first and second optical cores, including a metal wrapped around the outer perimeter of the cladding along at least a respective top, a respective bottom, and a respective side of each of the first and second optical cores, and being at least as wide as a skin depth of the metal at the wavelength in a dimension that extends from one of the first and second cores toward the other of the first and second cores.

20. The vehicle of claim 19 wherein:
the subsystem includes a navigation subsystem; and
the optical device includes a gyroscope.

* * * * *